Sept. 9, 1952  G. FOWLER  2,610,317
POWER FACTOR CONTROLLING AND REGULATING DEVICE
Filed April 8, 1948  2 SHEETS—SHEET 1

Girard Fowler
INVENTOR.

Sept. 9, 1952                G. FOWLER                2,610,317
POWER FACTOR CONTROLLING AND REGULATING DEVICE
Filed April 8, 1948                              2 SHEETS—SHEET 2
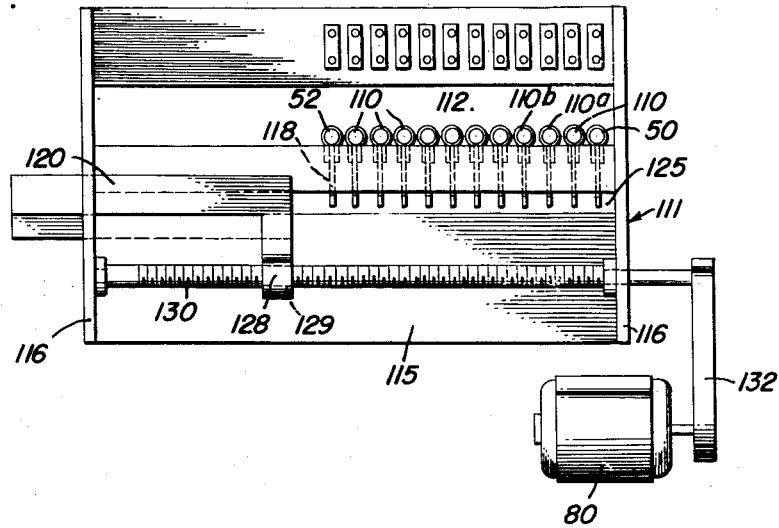
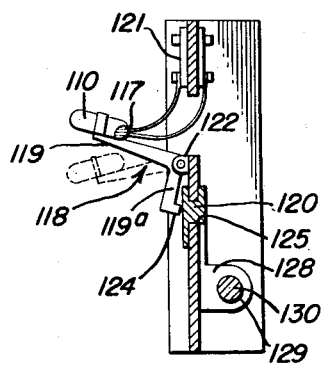
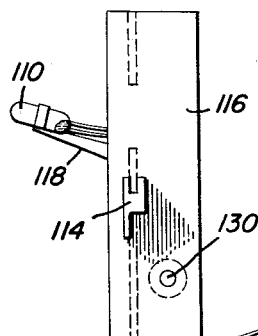
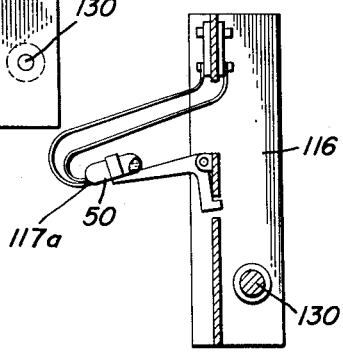
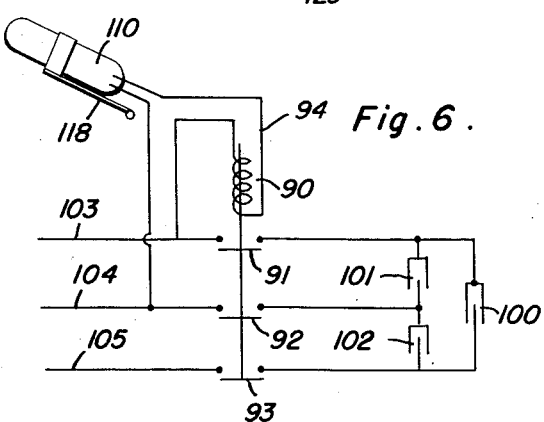
Girard Fowler
INVENTOR.

Patented Sept. 9, 1952

2,610,317

UNITED STATES PATENT OFFICE 2,610,317

POWER FACTOR CONTROLLING AND REGULATING DEVICE

Girard Fowler, Point Pleasant, W. Va.

Application April 8, 1948, Serial No. 19,808

3 Claims. (Cl. 323—105)

This invention relates to power factor control devices for power generating or power consuming installations and it has for its main object to provide a simple and effective automatic controller adapted to produce a gradual correction of the power factor in accordance with changing existing conditions, which attempts to restore the optimal conditions or those conditions which have been selected.

It is known in the art that the reactance of the equipment connected with and energized from an A. C. network or power house, imposes low power factor conditions on the network. Where the load is intermittent, pulsating or otherwise variable or where starting and stopping of electric appliances, cutting in and out of electric valves, furnaces and similar loads occurs, transient low power conditions are produced which are superposed on the steady low power operating conditions and therefore power factor conditions can only be corrected by means of an automatic variable device. Such devices have been proposed for power houses, but it is of great advantage for the utility service as well as for the consumer to be able to correct the power factor in any installation supplied from the power lines.

It is therefore one of the primary objects of the invention to provide an automatic power factor controller or regulator which corrects the power factor of any installation or of any part thereof with which it is associated continuously according to the variations in the load entailing varying power factor conditions, and which is operated by the power factor meter which may be associated with any group of the consuming equipment.

It is a further object of the invention to provide an automatic power factor controller, correcting the power factor of any installation or of any part thereof by means of a power factor meter which is operating upon deflection of the meter indicating a change of the normal power factor condition, without using any device which is current consuming when not actually active in correcting the power factor.

It is a further object of the invention to provide an automatic power factor controller or regulator which is controlled electrically by means adapted to be operated exclusively on alternating currents, but which controls the addition, selection or reduction of power factor correcting compensating loads mechanically, by the mechanical control of switches controlling the connection of said compensating loads with the power line.

It is a further object of the invention to provide a series of power factor correcting compensating loads to be added or eliminated successively and in steps and in further providing a mechanical means for bringing them into operation in a step by step fashion, said steps being controlled by the power factor meter.

It is a further object of the invention to provide a step by step control of the power factor correcting load by means of a motor the operation of which and the direction of operation of which is controlled by the power factor meter, said motor running continuously as long as the power factor meter indicates that a phase shifting between voltage and current transgressing a certain limit occurs but which motor drives a mechanical means acting in a series of separate successive steps on a series of circuits adding or eliminating power factor correcting loads to the load existing in the power line.

It is a still further object of the invention to use discharge tubes and condensers for operating selectively and by alternating currents only the relays which determine the operation and the direction of operation of the motor during the mechanical switch controlling means for the power factor correcting load circuits.

It is a still further object of the invention to provide limit switches which prevent a further operation of the motor when the mechanical means has reached the last switch of the series controlling the power correcting load circuit in the one and other direction.

Further and more specific objects will be apparent in the course of the detailed specification.

The invention is illustrated in the accompanying drawings showing one embodiment of the same. It is however to be understood that the embodiment shown has been selected in order to explain the principle of the invention and one of the preferred modes of applying it under certain conditions. The description and illustration of this specific example provide sufficient information to the expert skilled in this art to apply the said principle in cases differing from the example shown and no attempt is therefore made to provide a survey of the various embodiments of the invention. Modifications of the example shown are therefore not necessarily departures from the invention.

In the drawings:

Figure 2 is a diagrammatic elevational view of the bank of controlling switches and of the means for operating them.

Figure 3 is a cross sectional elevational view and Figure 4 is an elevational end view of the said switch bank.

Figure 5 is a similar cross sectional view illustrating a limit switch on said bank.

Figure 6 is a diagram of the connections of the power factor correcting appliances and their circuits controlled by the switches of the switch bank.

Figure 1:
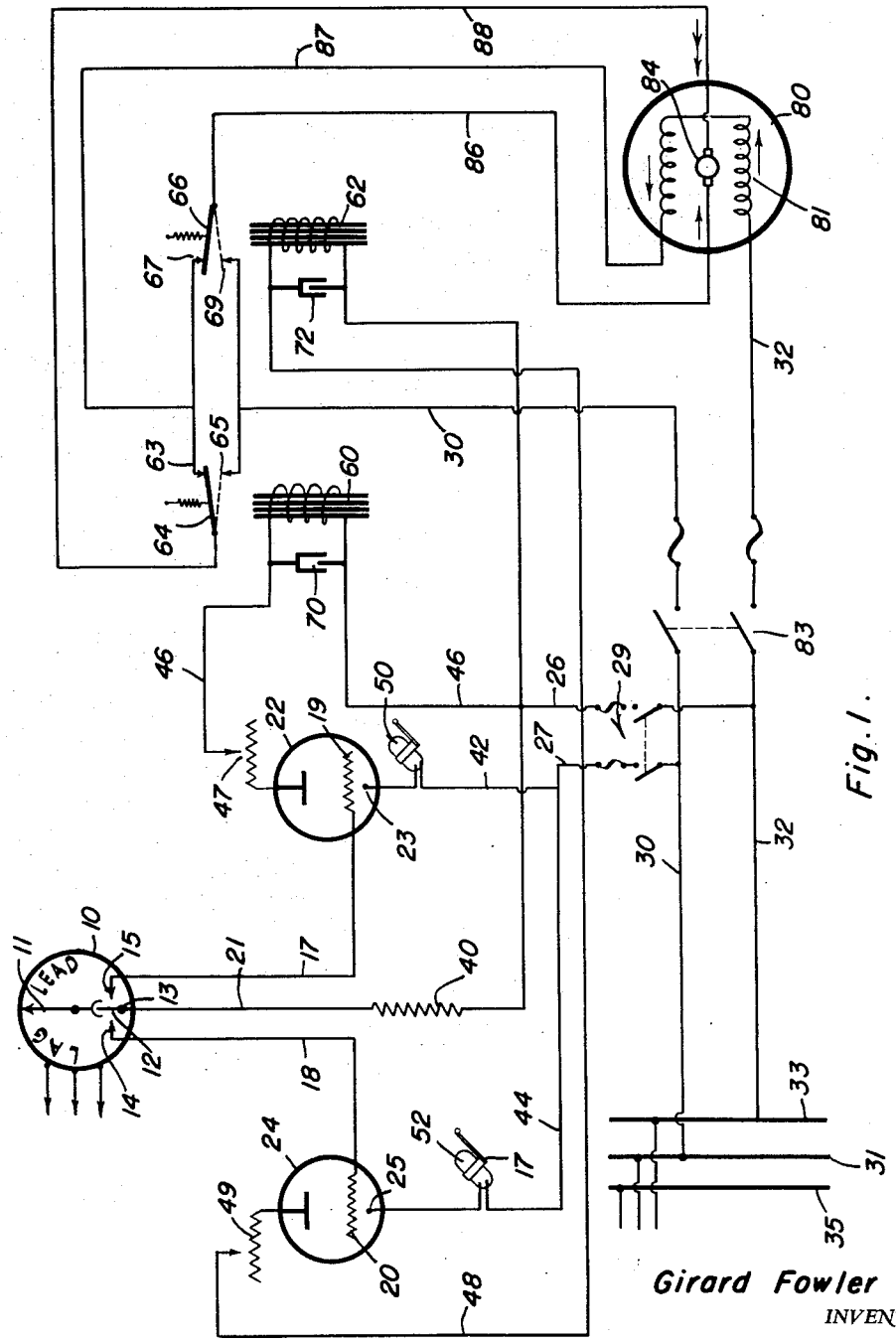
Figure 1 is a diagram of the connections of the electric motor operating the controller.

The embodiment of the invention which is illustrated relates to a system in which various conditions may occur and in which therefore the power factor may either be lagging or leading. The former term is applied as well known to cases in which the voltage and the current have a phase difference with the former leading, this condition being produced by inductive loads, such as transformers, inductive motors and the like. The latter term is applied, as equally well known, to cases in which the current leads, this condition being produced by capacitors, such as used for power factor correction, by over excited synchronous motors or the like. For correction of the lagging power factor, capacities are used, while leading power factors are corrected by inductances. If for instance a three phase network is used, it is customary to insert three condensers between the three phase lines for the purpose of power factor correction.

A low power factor condition corresponding to a large phase difference between current and voltage is objectionable in every type of power installation because it causes an overloading of the transformers, motors, generators etc. It is especially objectionable in the case of a power supplying utility service, as it causes a load which is not registered by the customary meters. The utility companies therefore add to those power consuming installations which may cause a reduction of the power factor a special meter indicating the phase difference between current and voltage or registering the power factor and a separate charge is made in accordance with the meter indications to the consumer using an equipment under low power factor conditions. The meter usually registers only a power factor decrease which passes a certain fixed limit which may be tolerated.

The present invention makes use of this meter the construction of which does not differ from that of the customary meters so that it need not be described in detail.

The customary meter is shown at 10 and it is provided with a pointer 11, occupying a central position, such as shown, when the voltage and the current are in phase, but moving to the right or to the left when the power factor is leading or lagging respectively. Either the shaft of the pointer or preferably an arm resiliently connected with the pointer, as diagrammatically indicated, moves an insulated contact arm 12, adapted to turn around a fulcrum or pivot 13 and cooperating with two insulated fixed contacts 14 and 15, which are adjustable individually.

The contact arm 12 carries a contact piece adapted to cooperate with contacts 14 and 15 which is connected by a conducting strip or wire (not specially indicated) with a conductor 21, leading to the pivot or fulcrum 13. Conductor 21 contains a resistance 40 and is connected with conductor 26 of a line branching off from the branch line 30, 32 leading for instance from two phase conductors 31, 33 of the three phase power supply line 31, 33, 35.

The two fixed adjustable contacts 14, 15 control circuits 17, 18 which include the starting or grid electrodes 19, 20 of two discharge tubes 22, 24. These tubes may, for instance, be cold cathode gas triode tubes of the ionic cathode glow discharge type; but it will be manifest that other types of tubes may also be used. The cathodes 23, 25 of the said tubes are connected with the second conductor 27 of the line branching off from branch line 30, 32, by means of leads 42, 44, which contain limit switches 50, 52 respectively to be described below. The line 26, 27 may also contain the double pole single throw switch 29 which permits the disconnection of the meter and discharge tubes.

The plate circuits 46, 48 of the two discharge tubes contain adjustable resistances 47, 49 and relays 60, 62 provided with relay armature contacts 64, 66. Each relay contact cooperates with two fixed contacts 63, 65 and 67, 69 respectively. A condenser 70, 72 is connected across the relay winding, bridging the same.

The relay contacts 64, 66 control a motor 80 which is preferably provided with a series winding 81 connected with one of the conductors 32 of branch line 30, 32. The branch line portion leading to the motor 80 may be provided with a separate double pole single throw switch 83. While the armature 84 of the motor is connected with the relay contacts 64, 66 by means of conductors 86, 88 respectively, the two interconnected fixed rest contacts 63, 67 are connected with the field winding 81 by conductor 87 while the two interconnected fixed operative contacts 65, 69 are connected with conductor 30 of the branch line.

The motor 80 as seen may run in both directions, according to the position of the relay armatures 64 and 66 which reverse the flow of current through the armature of the motor 80.

The corrective load devices consist of capacitors 100, 101, 102 (Figure 6), connected between the lines 103, 104, 105, connected with the power lines. In most cases the loads formed by transformers, motors and resistances are prevalently inductive and their influence on the power factor is compensated by corrective capacitors. The appearance of a leading power factor in such cases is mainly the consequence of an over compensation due to a decrease of the inductive load without corresponding reduction of the compensating capacitive load. Under these conditions merely capacitors need be used for maintaining the power factor at an optimal value, the numbers or capacities of which are increased or decreased. It will however be understood that while the present example is based on the above explained conditions, the invention may be carried into effect in practically the same manner or only with obvious modifications if some of the compensating loads are inductances.

Each compensating capacity which consists in the case of a three phase power line of the group of three capacitors 100, 101, 102 is connected with the power line or a branch thereof by means of a polarized A. C. relay or magnetic switch 90, with an armature carrying three relay contacts 91, 92, 93, one for each line. The circuit 94 of the relay is connected with two of the phase conductors and is controlled by a mercury switch 110.

All the mercury switches 110 controlling the compensating loads, are mounted on a vertical frame 111 consisting of a middle sheet 115 and end pieces 116. They form a switch bank generally indicated at 112. The individual switches are designated by reference numerals 110, 110a, 110b... Each of them is mounted on a switch holder 118 having the form of a bell crank lever which is pivoted on the frame 111 near its knee by means of lugs 122. The longer arm 119 of the switch holder carries the mercury switch 110, 110a, 110b near its end while the shorter arm 119a is provided with a lug or projection 124 turned toward the frame. Normally the bell crank lever rests on the frame. In this position (indicated in dotted lines) the mercury switch is outwardly inclined the mercury drop being on the outer end of the switch tube while the contacts 117 are at the inner end, near to the frame. The relay circuit is therefore open in the position of rest. The contacts 117 are connected with a contact bank 121 mounted on the upper portion of the frame by suitable flexible connections.

Below the zone in which the switch holders are pivoted the frame is provided with a slot 125 in which a cam member 120 may move. This cam member consists of a grooved rail preferably provided with an extending ledge adapted to slide along the frame within the slot and guiding itself by the groove engaging the frame portion above the slot and by the ledge applied against its surface. The cam member is of considerable length, and may pass through the end pieces 116 of the frame by means of suitable openings 114. The length of the cam member must be at least equal to the length of the switch bank.

Said cam member 120 is provided with a guide lug 128 or a plurality of guide lugs, each provided with a threaded opening 129 through which a threaded spindle 130 passes. This spindle is journalled in the end pieces and secured against longitudinal movement by suitable collars. It is driven by the motor 80 by means of suitable reduction gears enclosed in the gear box 132.

The rotation of the spindle in the one or other direction advances the cam member 120 longitudinally in the one or other direction. While so advanced the cam member 120 which is provided with a tapering front end, lifts the lugs 124 in whose vicinity it is advanced and thereby turns the downwardly pointing arm 119 of the switch holder 118 upwardly. The mercury switch 110 is moved to an inwardly inclined position (as shown in full lines) in which the mercury drop rests on the end of the switch turned towards the frame and closes the contacts 117 arranged on this end.

The outermost switches of the switch bank are formed by the limit switches 50 and 52 controlling the admission of current to the tubes 22, 24. These switches have the same construction as the switches 110 but switch 50 differs from the other switches insofar as the contacts 117a are on the other or outer end as shown in Figure 5. Therefore switch 50 breaks the circuits when lifted by the cam member and cuts out the tube 22. Similarly switch 52 cuts out tube 24.

From the above detailed description of the apparatus the operation will be clearly understood.

Let it be assumed that switches 29 and 83 are closed and that at first a balanced condition exists with the voltage and current in phase and that by some change, for instance by the switching in of an inductive load, a lagging power factor is produced. While the pointer of the power factor meter at first was in its middle position, the movement of the pointer 11 to the left moves contact arm 12 to the right and therefore its contact piece comes into contact with the fixed contact 15 thereby energizing the starting electrode 19 of tube 22. The circuit starts at 33 and runs over 32, closed switch 29, 26, 40, 21, 12, 15, 17 to electrode 19.

During the positive half wave in conductor 33, which coincides with a negative phase in conductor 31 the starting grid 19 gets a positive charge while a negative charge is imparted to the cathode 23 from 31 over 30, closed switch 29, 27, 42 and closed limit switch 50. The plate of the tube is also at a positive potential over 46, 47, and therefore the tube fires and the plate current energizes the relay 60 and charges the condenser 70. During the negative half wave the tube is de-energized but the condenser 70 discharges itself over the relay 60 which is in parallel with it. The next positive half wave repeats the performance of the first positive half wave and so forth so that during both the positive and the negative wave unidirectional current is flowing through the relay 60 as long as current flows through the tube. Relay 60 therefore attracts its armature 64 and holds it in the position indicated in dotted lines in which it rests on contact 65 as long as the grid electrode 19 is connected with the net conductor 32.

In this position the current flows from 33 and 32 over closed switch 83 and field windings 81 of motor 80 over 87 and 67, 66, 86 to armature 84 and over 88, 64, 65 and 30 to 31. During the positive phase in 33, for instance, the current, as will be observed, will flow through the armature and field winding in the direction of the arrow with one point. The motor will therefore rotate in a definite direction.

Upon rotation of the motor 80 the spindle 130 is rotated in such a direction by means of gears that the threaded guide lug 128 engaging the spindle moves from the left to the right in Figure 2. The cam member 120 is advanced and trips a mercury switch 110 which closes the circuit of polarized relay 90. Contacts 91, 92, 93 are therefore closed and a capacitive load 101, 102, 103 is now put on the line, which compensates the influence of the inductive load on the power factor.

If this compensation is sufficient the switching in of the condensers will cause the meter to swing back and further movement of motor 80 is stopped. If the compensation was not sufficient, the pointer 11 will still be on the left side and operation will continue, a second mercury switch is tripped, a further capacitive load is put on the line and the operation continues automatically until compensation is achieved.

Let it now be assumed that all the capacitive loads have been switched in, but that compensation has not been effected. In this case the cam member 120 has been advanced to the extreme right and after having tripped all the switches 110 now trips the last switch 50. This switch as will be remembered is the limit switch which was closed when not tripped and it is now opened when the cam member 120 lifts it and cuts out any further operation by interrupting the tube circuits. As all compensating means have been switched in, there is no need for further operation in this direction and the operation stops. The attendant may be informed of this condition in any appropriate manner, but this is not shown in the drawings.

Should the inductive load decrease in this or another position of the apparatus in which capacitive loads have been connected with the line, the pointer of the power factor meter will move to the right side in Figure 1 as now the current leads. Thereby arm 12 moves to the left and contacts the fixed contact 14. This connects line 33 with starting grid electrode 20 of tube 24 over the connections above mentioned to contact 12 to contact 14 and line 18. Now relay 62 operates in a manner analogous to that described in connection with relay 60. Armature 66 adopts the position shown in dotted line and current flows now from 32 over 81, contact 63, 64, 88, armature 84, 66, 69 to 30. It will be observed that while the current through the field winding, say during the positive phase, is still indicated by the same arrows placed near the field windings, the direction of the current flow through the armature is now indicated by the arrow with two heads. The relative flow of current is therefore reversed and the motor 80 rotates in the opposite direction. Therefore the spindle 130 rotates in opposite direction.

The rotation of the spindle now moves the cam member 120 from right to left in Figure 2. The cam member therefore withdraws from switch after switch 110 thereby cutting out the capacitive loads. The motor stops as soon as the compensation is obtained and current and voltage are in phase or are only out of phase for the phase angle which is tolerated. Should the capacitive load still exceed the inductive load when the cam member has reached the left end of the switch bank 112 switch 52 will finally be opened and further operation will be cut off.

As already stated, it may be advisable in some cases in which capacitive loads are on the line to provide compensating inductive loads instead of the capacitive loads in the circuits on the left end of the series.

It will be seen that the system as described provides a very precise control of the power factor in as many steps as may be considered as suitable which does not consume any current except when in actual corrective operation. Moreover the system is fully automatic and protects the utility service against the undesirable overloads of the generators as well as the consumer against undesirable overloading of his equipment and undesirable charges for such overload.

It will be understood that constructive changes of an unessential nature will not affect the principle and operation as above described.

Having described the invention, what is claimed as new is:

1. A power factor controller for polyphase alternating current power lines with a series of power factor correcting devices, connected and disconnected with said power lines by a series of switches operated in succession by a reversible electric motor, said controller further including a power factor meter provided with contacts alternatively closed upon deviation of the power factor from a predetermined value in different directions comprising alternating currents carrying circuits connected with the contacts of the said power factor meter, a grid controlled electronic tube in each of said power factor controlled alternating current circuits, said tube being provided with cathode, plate and grid, the latter being directly connected with one of the power factor meter controlled alternating current circuits, an energizing circuit for each of said tubes, directly connected with the alternating current power lines, the power factor of which is supervised by the power factor meter, a relay and a condenser, the latter connected in parallel to the relay, arranged in the plate circuit of each tube, a relay armature for each of said relays, arranged to adopt two contact positions, two stationary contacts for each relay armature, one for the position of rest and the other for the energized position of the relay, field windings and field circuits and an armature circuit for said reversible electric motor, the relay armatures of the relays being connected with the said armature circuit of the reversible motor, and the rest contacts of both relay armatures, connected in parallel, and with one side of the field winding, the other side of said winding being connected with one of the power lines, while the stationary contacts of the relay armature for the energized position of the same are connected in parallel, both being connected with one of the power lines, the relays thus receiving direct current pulses operating them and when operated changing the relative direction of current flow in the field and armature winding of the reversing electric motor.

2. In a power factor controlling apparatus as claimed in claim 1, a number of compensatory units directing the power factor, each consisting of elements symmetrically inserted between the polyphase lines, a separate relay for each of said units simultaneously switching in and out the connections of each unit with the polyphase lines, an energizing circuit for said relay branching off from said power lines, a switch bank with tiltable mercury switches, each mercury switch controlling the energizing circuit of one of said relays, said switch bank further having a frame plate provided with a longitudinal slot, bellcrank levers pivotally mounted on said frame plate along said slot, one end of each bellcrank lever supporting said tiltable mercury switch, the other ends of the bellcrank levers being aligned and resting on the frame plate to hold the mercury switches in their open position, a slide member slidably arranged in said slot of said frame and sliding along the line along which said aligned bellcrank lever ends rest to lift the said ends successively during its movement, thus bringing the mercury switches successively one by one into their circuit closing position, a threaded guiding lug on said slide, a rotatable spindle engaging said threaded lug, said spindle being driven by the reversible electric motor.

3. A power factor controller as claimed in claim 1, wherein the first and last mercury switch of the switch bank are limit switches, operated when all power factor compensating units have been switched in or out respectively, said first and last switches of the switch bank being arranged in the energizing circuit of the electronic tubes respectively.

GIRARD FOWLER.

REFERENCES CITED

The following references are of record in the file of this patent:

UNITED STATES PATENTS

| Number | Name | Date |
|---|---|---|
| 1,669,112 | Winter | May 28, 1928 |
| 1,951,733 | Knieszner | Mar. 20, 1934 |
| 1,959,298 | Levy | May 15, 1934 |
| 2,078,667 | Kado | Apr. 27, 1937 |
| 2,232,993 | Berquist | Feb. 25, 1941 |
| 2,243,584 | Toda | May 27, 1941 |
| 2,460,467 | Nelson | Feb. 1, 1949 |